United States Patent
Nishimura et al.

(10) Patent No.: US 12,249,815 B2
(45) Date of Patent: Mar. 11, 2025

(54) WIRING BODY WITH ASSEMBLY ASSISTING COMPONENT, ASSEMBLY ASSISTING COMPONENT OF WIRING BODY, AND METHOD OF MANUFACTURING WIRING BODY ASSEMBLY

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 1197 days.

(21) Appl. No.: 16/976,801

(22) PCT Filed: Dec. 28, 2018

(86) PCT No.: PCT/JP2018/048437
§ 371 (c)(1),
(2) Date: Aug. 31, 2020

(87) PCT Pub. No.: WO2019/181141
PCT Pub. Date: Sep. 26, 2019

(65) Prior Publication Data
US 2021/0006048 A1    Jan. 7, 2021

(30) Foreign Application Priority Data
Mar. 20, 2018   (JP) .................................. 2018-052775

(51) Int. Cl.
H02G 1/06        (2006.01)
B60R 16/02       (2006.01)
(Continued)

(52) U.S. Cl.
CPC ........... *H02G 1/06* (2013.01); *B60R 16/0215* (2013.01); *H01B 7/00* (2013.01); *H01B 7/40* (2013.01);
(Continued)

(58) Field of Classification Search
CPC ...... H02G 1/06; H02G 3/305; B60R 16/0215; H01B 7/00; H01B 7/40; H01R 43/26
(Continued)

(56) References Cited

U.S. PATENT DOCUMENTS 4,878,639 A    11/1989   Tempco
5,957,702 A    9/1999    Nagai et al.
(Continued)

FOREIGN PATENT DOCUMENTS

CN    1190816      8/1998
CN    102216121    10/2011
(Continued)

OTHER PUBLICATIONS

Office Action issued in China Patent Application No. 201880091392.3, dated Oct. 19, 2021, together with an English translation (partial) thereof.
(Continued)

*Primary Examiner* — Tremesha W Burns
(74) *Attorney, Agent, or Firm* — Greenblum & Bernstein, P.L.C.

(57) ABSTRACT

A wiring body with assembly assisting component includes a wiring body and an assembly assisting component. The wiring body includes a wiring component (for example, an electrical wiring). The wiring body is a wire harness, for
(Continued)

example. The assembly assisting component detachably holds at least a part of the wiring body along a certain route.

12 Claims, 16 Drawing Sheets

(51) Int. Cl.
    *H01B 7/00*     (2006.01)
    *H01B 7/40*     (2006.01)
    *H01R 43/26*     (2006.01)
    *H02G 3/30*     (2006.01)
    *H02G 3/32*     (2006.01)

(52) U.S. Cl.
    CPC .............. *H01R 43/26* (2013.01); *H02G 3/305* (2013.01); *H02G 3/32* (2013.01); *H01B 7/009* (2013.01)

(58) Field of Classification Search
    USPC ........................................................ 174/68.1
    See application file for complete search history.

(56) References Cited

U.S. PATENT DOCUMENTS

2012/0024564 A1     2/2012     Sekino et al.
2014/0345900 A1     11/2014     Saito et al.

FOREIGN PATENT DOCUMENTS

| | | |
|---|---|---|
| CN | 104184084 | 12/2014 |
| CN | 206099231 | 4/2017 |
| JP | 06-29326 | 4/1994 |
| JP | 10-84613 | 3/1998 |
| JP | 2006-244748 | 9/2006 |
| JP | 2006-244935 | 9/2006 |
| JP | 2012-235623 | 11/2012 |
| JP | 2013-99179 | 5/2013 |
| JP | 2017-158285 | 9/2017 |

OTHER PUBLICATIONS

Japan Official Action issued in Japan Patent Application No. 2018-052775, dated Feb. 24, 2021, together with English translation thereof.
Office Action issued in China Patent Application No. 201880091392.3, dated Apr. 6, 2021, together with an English translation thereof.
International Search Report (ISR) issued in International Patent Application No. PCT/JP2018/048437, dated Feb. 19, 2019, together with English Translation thereof.
International Preliminary Report on Patentability (IPRP) issued in International Patent Application No. PCT/JP2018/048437, dated Oct. 1, 2020, together with English Translation thereof.

F I G. 7
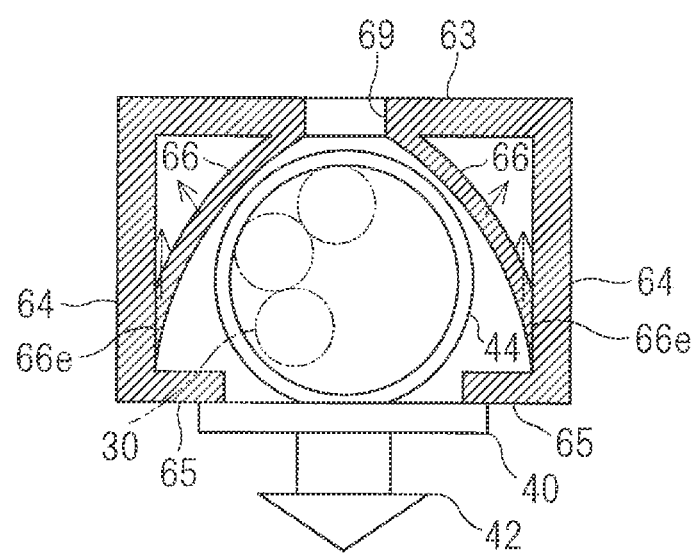

F I G. 1 3
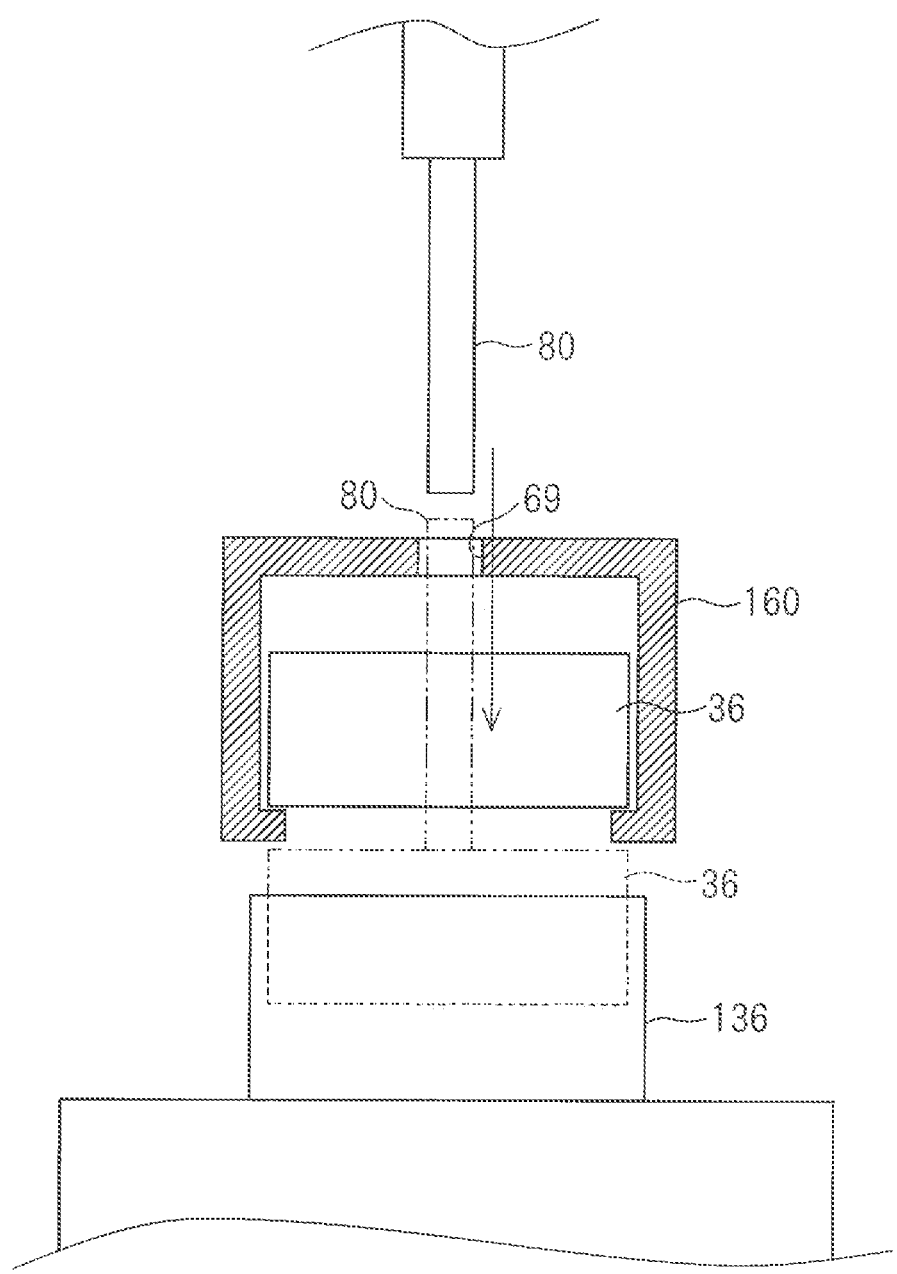

F I G. 2 4
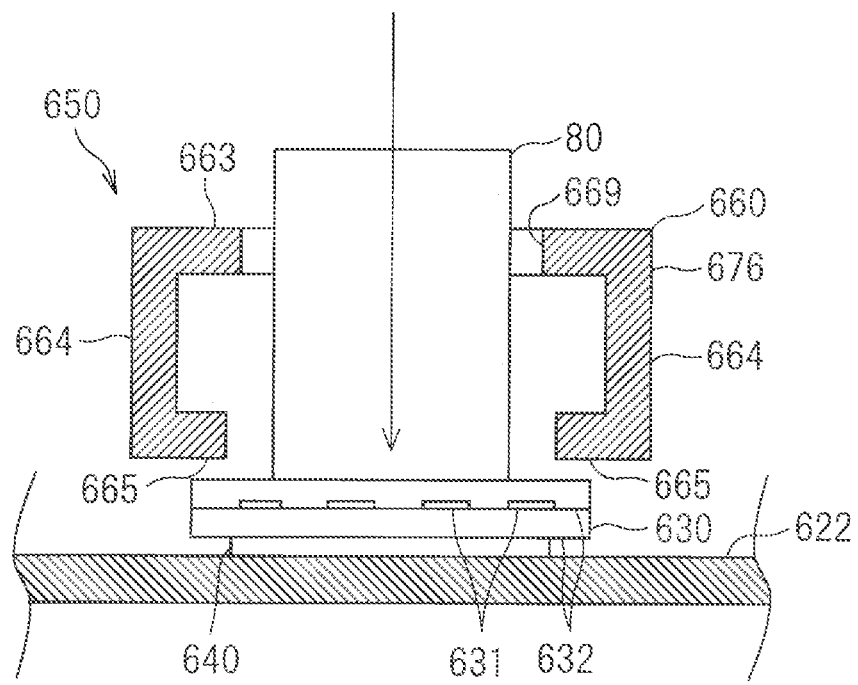

WIRING BODY WITH ASSEMBLY ASSISTING COMPONENT, ASSEMBLY ASSISTING COMPONENT OF WIRING BODY, AND METHOD OF MANUFACTURING WIRING BODY ASSEMBLY

TECHNICAL FIELD

The present invention relates to a technique for easily assembling a wiring body such as a wire harness to a vehicle.

BACKGROUND ART

Patent Document 1 discloses a cassette type wire harness in which a plurality of connectors of a wire harness are connected to constitute a connector row, and the connector row and a slack of electrical wirings between the connectors are housed in a guide case. According to this cassette type wire harness, the guide case is held by a robot, and each of the plurality of connectors which has been housed can be sent out one by one from a top thereof to be assembled to the other side unit.

A package body disclosed in Patent Document 2 includes a wire harness and a bobbin around which the wire harness is wound. A plurality of connector holders are provided on the bobbin at an appropriate interval in a circumferential direction. The electrical wirings of the wire harness are wound around the bobbin from one end side, and the plurality of connectors of the wire harness are held one by one by the connector holders. According to this package body, the package body can be attached to the robot and the connector can be sequentially assembled to the other side connector.

PRIOR ART DOCUMENTS

Patent Documents

Patent Document 1: Japanese Patent Application Laid-Open No. 2006-244748
Patent Document 2: Japanese Patent Application Laid-Open No. 2006-244935

SUMMARY

Problem to be Solved by the Invention

The wire harness itself is made up of an electrical wiring which is a flexible object, for example. The wire harness is disposed along a certain route in a vehicle, for example, and assembled thereto.

However, in the techniques in Patent Document 1 and Patent Document 2, the route of the wire harness itself is not regulated, thus the wire harness is hardly disposed along a predetermined route.

Accordingly, an object of the present invention is to provide a technique capable of easily locating a wiring body along a predetermined route.

Means to Solve the Problem

In order to solve the above problem, a wiring body with assembly assisting component according to a first aspect includes: a wiring body including a wiring component; and at least one assembly assisting component detachably holding at least a part of the wiring body along a certain route.

A second aspect is the wiring body with assembly assisting component according to the first aspect, and includes an electrical wiring as the wiring component.

A third aspect is the wiring body with assembly assisting component according to the first or second aspect, and includes a band-like cable which can be curved as the wiring component.

A fourth aspect is the wiring body with assembly assisting component according to any one of the first to third aspects, wherein the wiring body includes a fixing component attached to the wiring component and can be fixed to an assembled position, and the assembly assisting component includes a fixing component holding part detachably holding the fixing component.

A fifth aspect is the wiring body with assembly assisting component according to the fourth aspect, wherein the fixing component holding part holds the fixing component in a posture of being able to be fixed to an assembled position.

A sixth aspect is the wiring body with assembly assisting component according to the fourth or fifth aspect, wherein an operation hole into and from which an operation component can be inserted and detached is formed in the fixing component holding part, and the fixing component holding part holds the fixing component in a position and a posture where the fixing component is detached from the fixing component holding part and can be fixed to an assembled position by inserting the operation component into the operation hole to press the fixing component.

A seventh aspect is the wiring body with assembly assisting component according to any one of the first to sixth aspects, wherein the assembly assisting component includes a main plate formed into an elongated plate-like shape, a pair of side parts provided on both sides of the main plate, and at least one holding protrusion protruding inward from at least one of tip end portions of the pair of side parts, and holding the wiring component in a space surrounded by the main plate and the pair of side parts.

An eighth aspect is the wiring body with assembly assisting component according to any one of the first to seventh aspects, and includes the plurality of assembly assisting components.

A ninth aspect is the wiring body with assembly assisting component according to the eighth aspect, wherein at least two of the plurality of assembly assisting components can be separated from and incorporated with each other.

A tenth aspect is the wiring body with assembly assisting component according to the eighth or ninth aspect, wherein at least two of the plurality of assembly assisting components are connected to be able to be mutually bent.

An assembly assisting component of a wiring body according to an eleventh aspect detachably holds at least a part of the wiring body including a wiring component along a certain route.

A method of manufacturing a wiring body assembly according to a twelfth aspect includes steps of: holding at least a part of a wiring body including a wiring component in an assembly assisting component along a certain route; locating the wiring body in an assembled position together with the assembly assisting component; and detaching the wiring body from the assembly assisting component and attaching the wiring body to the assembled position.

Effects of the Invention

According to the first aspect, the wiring body can be disposed on the assembled position in the state where at least the part of the wiring body is held by the assembly assisting component along the certain route, and subsequently, the wiring component can be detached from the assembly assisting component. Accordingly, the wiring body can be easily disposed along a predetermined route.

According to the second aspect, the wiring body including the electrical wiring, for example, the wire harness made up of a bundle of plural electrical wirings can be easily disposed along a predetermined route.

According to the third aspect, the band-like cable which can be curved such as the flexible flat cable, for example, can be easily disposed along a predetermined route.

According to the fourth aspect, the assembly assisting component includes the fixing component holding part detachably holding the fixing component, thus the fixing component can be easily fixed to the assembled position while the wiring body is easily disposed along a predetermined route.

According to the fifth embodiment, the fixing component holding part holds the fixing component in the posture of being able to be fixed to the assembled position, thus the fixing component can be easily fixed to the assembled position while the wiring member is easily disposed along a route.

According to the sixth aspect, the operation component is inserted into the operation hole to press the fixing component, thus the fixing component can be fixed to the assembled position. Accordingly, the fixing component can be easily fixed to the assembled position while the wiring component is easily disposed along a route.

According to the seventh aspect, the wiring member is held in the space surrounded by the main plate having the elongated plate-like shape and the pair of side parts, thus the wiring member hardly comes out from the assembly assisting component and can be easily retained along the certain route.

According to the eighth aspect, the wiring body can be held by the plurality of assembly assisting components along various routes.

According to the ninth aspect, at least two of the plurality of assembly assisting components can be separated from and incorporated with each other, thus the wiring body can be held along a longer route.

According to the tenth aspect, at least two of the plurality of assembly assisting components are connected to be able to be mutually bent, thus can be bent at a time of storage and transfer to easily have a compact form.

According to the eleventh aspect, the wiring body can be disposed on the assembled position in the state where at least the part of the wiring body is held by the assembly assisting component along the certain route, and subsequently, the wiring component can be detached from the assembly assisting component. Accordingly, the wiring body can be easily disposed along a predetermined route.

According to the twelfth aspect, at least the part of the wiring body including the wiring component is held in the assembly assisting component along the certain route, the wiring body is disposed in the assembled position together with the assembly assisting component, and the wiring body is detached from the assembly assisting component and attached to the assembled position, thus the wiring body can be easily disposed along a predetermined route.

BRIEF DESCRIPTION OF DRAWINGS

FIG. 7 A schematic cross-sectional view illustrating a wiring body with assembly assisting component according to a third modification example.

FIG. 13 A schematic cross-sectional view illustrating a wiring body with assembly assisting component according to a fourth modification example.

FIG. 24 An explanation drawing illustrating a method of manufacturing a wiring body assembly.

DESCRIPTION OF EMBODIMENT(S)

Described hereinafter are a wiring body with assembly assisting component, an assembly assisting component for the wiring body, and a method of manufacturing a wiring body assembly according to embodiments.

Figure 1:
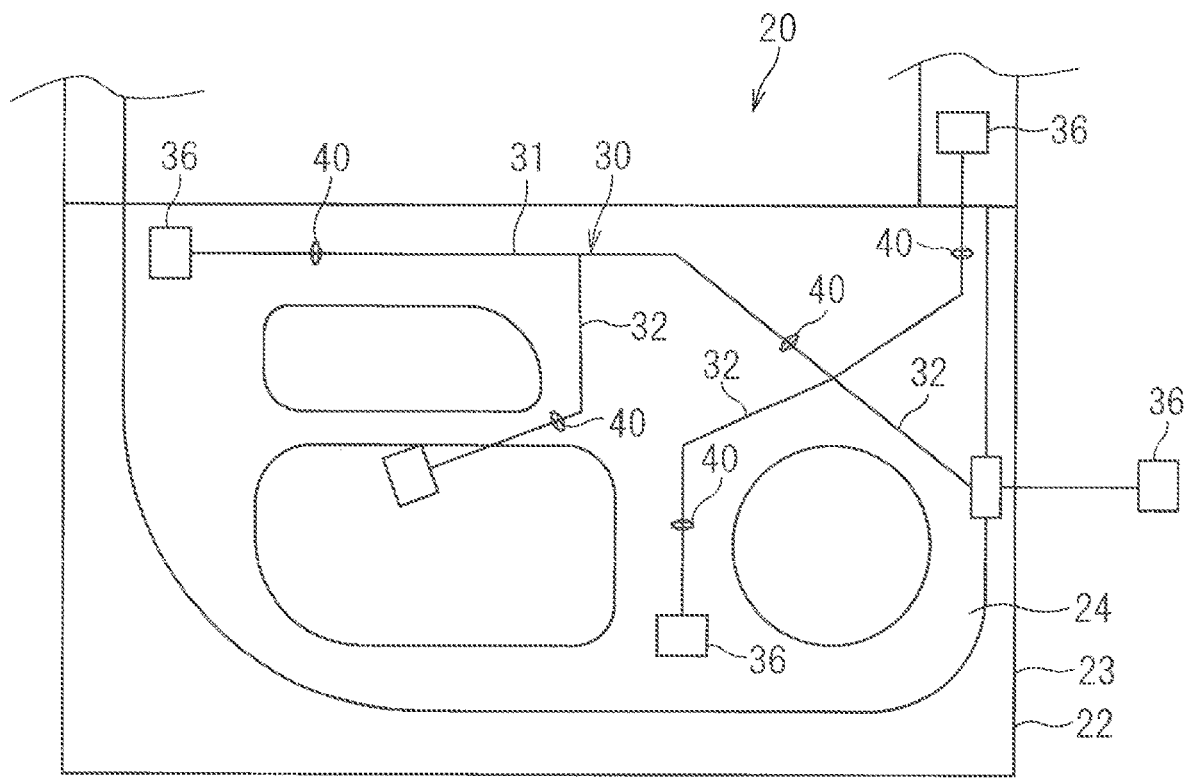
FIG. 1 A schematic view illustrating an example of a wiring body assembly.

An example of a wiring body assembly 20 is described first. FIG. 1 is a schematic view illustrating an example of the wiring body assembly 20. In the example described herein, a wiring body is a wire harness 30 and an assembly is a door 22 of a vehicle. The assembly needs not be the door 22 of the vehicle, but may be the other unit of the vehicle; for example, a floor, a ceiling, an inner side of an installment panel, or an engine room.

The door 22 is a part which can open and close to divide an interior of the vehicle and an outer side thereof. FIG. 1 illustrates an outer panel 23 and an inner panel 24 made up of a metal plate, for example, in the door 22. The outer panel 23 is a part facing the outer side of the vehicle. The inner panel 24 is provided on an inner side of the outer panel 23. A resin panel, for example, attached to an inner side of the inner panel 24 is omitted in FIG. 1.

Various electronic apparatuses are attached to and near the inner panel 24. Considered as the electronic apparatuses are an open-close motor for a window, a door lock motor, a speaker, and various switches. The wire harness 30 connected to these electronic apparatuses is connected to the inner panel 24. The wire harness 30 is led from the door 22 to a vehicle body side, and is also connected to a battery and a control apparatus, for example.

The wire harness 30 is an example of a wiring body including a wiring component.

Figure 3:
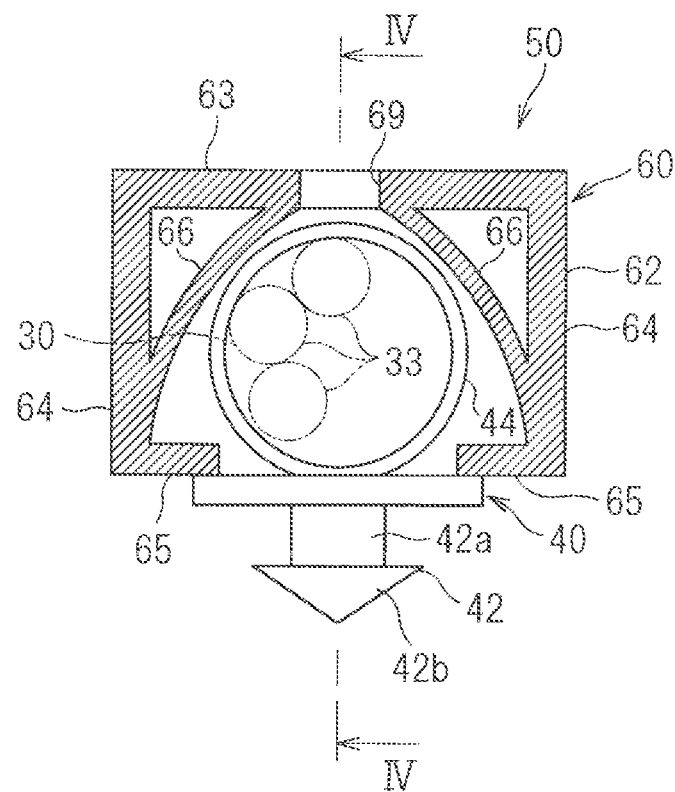
FIG. 3 A schematic cross-sectional view along a III-III line in FIG. 2.

Herein, the wire harness 30 includes an electrical wiring 33 as a wiring component (FIG. 3 partially illustrates the electrical wiring 33). More specifically, the wire harness 30 includes a plurality of electrical wirings 33. The electrical wiring 33 is a linear wiring component having a covering with a resin, for example, around a core wire formed of copper, copper alloy, aluminum, or aluminum alloy, for example. The plurality of electrical wirings 33 are branched and bundled in accordance with a wiring route and a position where each electronic apparatus is connected in the door 22, thereby constituting the wire harness 30. Herein, the wire harness 30 includes a main line part 31 and at least one (three herein) branch line part 32. The main line part 31 is curved in a midway portion. The branch line part 32 is branched from a midway portion of the main line part 31 and extends upward or downward.

A connector 36 is connected to both end portions of the main line part 31 and a tip end portion of the branch line part 32. An end portion of the electrical wiring 33 is connected to the connector 36.

A fixing component is attached to the wire harness 30. The fixing component is a component which can fix the wire harness 30 to the inner panel 24 of the door 22 to which the wire harness 30 is to be assembled. In the example described herein, the fixing component is a band clamp 40. The band clamp 40 includes a clamp body part 42 and a band 44 (refer to FIG. 3, FIG. 4, and FIG. 10). The clamp body part 42 is formed to be able to be inserted into and fixed to a hole 25*h* formed in an assembled object (a door herein). For example, applicable to the clamp body part 42 is a configuration that a locking piece 42*b* is formed on a tip end portion of a column part 42*a*, the locking piece 42*b* being able to be inserted into the hole 25*h* and locked to a peripheral edge part of the hole 25*h* while being inserted not to come out therefrom. The band 44 is formed to be able to be wound around and fixed to the wire harness 30. For example, applicable to the band 44 is a configuration that a band-like part extends from a head of the clamp body part 42, and a locking part is formed on the head so as to insert and fix the band-like part to prevent the band-like part from coming out in one direction. The band 44 is wound and fixed to a position of the wire harness 30 in a longitudinal direction, thus the band clamp 40 is fixed to a midway portion of the ire harness 30 in the longitudinal direction. In this state, the clamp body part 42 protrudes in an outward direction from part of the circumferential direction of the midway portion of the wire harness 30.

In the present embodiment, as an example, the band clamp 40 is provided in two positions in the main line part 31 and one position in each branch line part 32. The position where the band clamp 40 is fixed is not limited to the above example, however, the band clamp 40 can be provided in an optional position.

The example of the fixing component which can be attached to a wiring member and fixed to the assembled position is not limited to the above example. For example, the fixing component may be a sleeve clamp fixed to the wire harness by wounding an adhesive tape around the wire harness or the like. For example, the fixing component may be a member fixed to the wire harness by winding a belt or an adhesive tape and externally fitted and fixed to a plate-like or rod-like member (a member referred to as a bracket or stud bolt, for example) standing in the vehicle or a member fixed to a fixed member provided in the vehicle by a convex-concave fitting (a member referred to as a cassette structure, for example). For example, the fixing member may be a double-sided tape or a butyl adhesive tape adhering to the wiring member. For example, it is also applicable that the fixing member is a connector attached to an end portion of the wiring member and fixed when the connector is connected to the other side connector provided in the vehicle. The case where the fixing component is the connector or the double-sided tape is also described in modification examples hereinafter.

The band clamp 40 as the fixing component described above is inserted into and fixed to the hole 25*h* of the door 22, thus the wire harness 30 is fixed to the door 22 in a state of being disposed along a predetermined route.

As described above, when the wire harness 30 is assembled to the door 22, an operation of locating the wire harness 30 along the predetermined route is necessary. However, the wire harness 30 is a flexible object, so that the operation of locating the wire harness 30 along the predetermined route is hardly performed. A protrusion direction of the band clamp 40 with respect to an outer periphery of the wire harness 30 is not constant, so that the operation of inserting the band clamp 40 into the hole 25*h* is also hardly performed.

Performed accordingly is an operation of assembling the wire harness 30 to the door 22 using an assembly assisting component.

Figure 2:
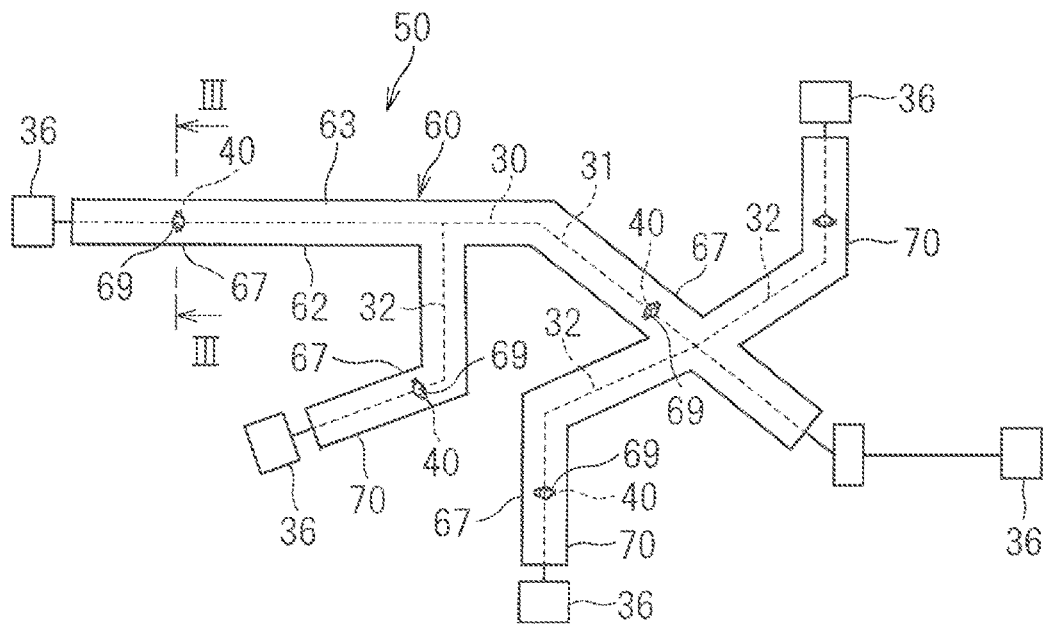
FIG. 2 A schematic plan view illustrating a wiring body with assembly assisting component.
Figure 4:
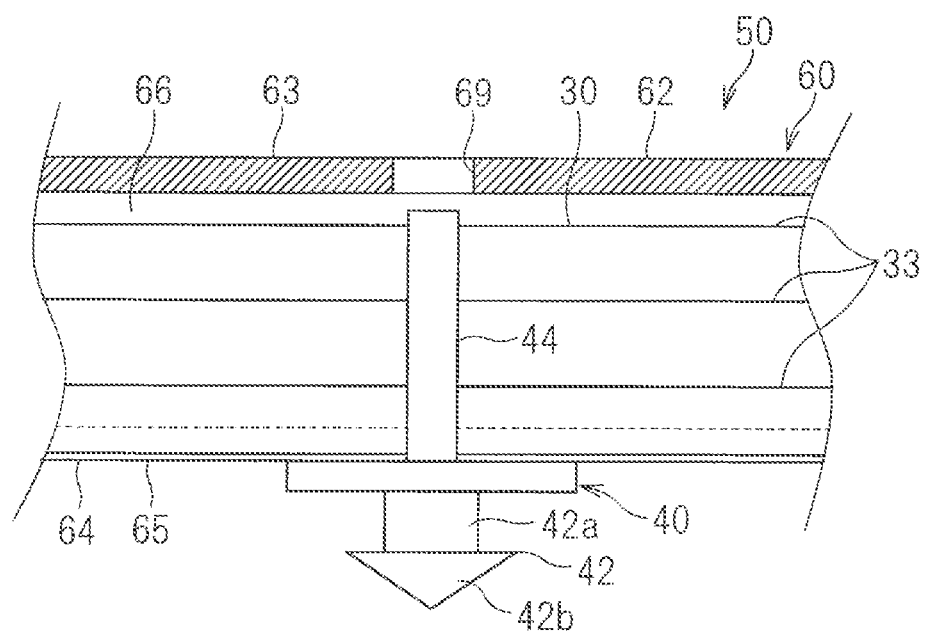
FIG. 4 A schematic cross-sectional view along a IV-IV line in FIG. 3.

FIG. 2 is a schematic plan view illustrating a wiring body with assembly assisting component 50, FIG. 3 is a schematic cross-sectional view along a III-III line in FIG. 2, and FIG. 4 is a schematic cross-sectional view along a IV-IV line in FIG. 3.

The wiring body with assembly assisting component 50 includes the wire harness 30 as the example of the wiring body and an assembly assisting component 60.

The assembly assisting component 60 is a member formed of a resin or metal, for example, and detachably holds at least a part of the wire harness 30 along a certain route.

More specifically, the assembly assisting component 60 includes a main line assembly assisting part 62 and a branch line assembly assisting part 70.

The main line assembly assisting part 62 detachably holds at least a part of the main line part 31 of the wire harness 30 along a certain route. The certain route herein indicates a certain route along a route of the main line part 31 disposed on the door 22. Herein, the assembly assisting component 60 detachably supports the main line part 31 of the wire harness 30 along a certain route curved in a midway portion.

More specifically, the main line assembly assisting part 62 includes a main plate 63, a pair of side parts 64, and a pair of holding protrusions 65.

The main plate 63 is formed into an elongated plate-like shape. Herein, the main plate 63 is curved in a midway portion in a width direction in accordance with the route of the main line part 31 in the door 22.

The pair of side parts 64 are provided on both sides of the main plate 63, and protrude toward one main surface side of the main plate 63. A width dimension of the main plate 63 is set equal to or larger than a diameter of the main line part 31, and a protrusion dimension of the pair of side parts 64 is set equal to or larger than the diameter of the main line part 31. The main line part 31 can be housed along the certain route in a space surrounded by the main plate 63 and the pair of side parts 64.

The pair of holding protrusions 65 protrude inward from tip end portions of the pair of side parts 64, and hold the main line part 31 in the space surrounded by the main plate 63 and the pair of side parts 64. Herein, a dimension between the tip end portions of the pair of holding protrusions 65 is set smaller than the diameter of the main line part 31. Accordingly, the main line part 31 housed in the space surrounded by the main plate 63 and the pair of side parts 64 is held to hardly come out from the main line assembly assisting part 62 through a space between the pair of holding protrusions 65. When the main line part 31 is pressed toward the tip end portions of the pair of holding protrusions 65 from a side of the main plate 63 of the main line assembly assisting part 62, the main line part 31 slips out of the space between the pair of holding protrusions 65 and is detached from the main line assembly assisting part 62 by at least one of an outward elastic deformation of at least one of the pair of side parts 64 and pair of holding protrusions 65 and an elastic deformation of the main line part 31 to reduce a width thereof.

Herein, the pair of holding protrusions 65 are provided on the both tip end portions of the pair of side parts 64, however, a holding protrusion may be provided on only one side part. In this case, a dimension of a gap between the tip end portion of the holding protrusion provided on one holding protrusion and the other holding protrusion is preferably set smaller than the diameter of the main line part 31.

Herein, the pair of side parts 64 and the pair of holding protrusions 65 are provided to extend over the whole main plate 63 in an extension direction, however, at least one of the pair of side parts and the pair of holding protrusions may be partially provided in a position of the main plate in the extension direction.

Provided in the present embodiment are a pair of guide pieces 66 extending from the tip end portions on inner sides of the pair of side parts 64 toward a position close to a center of the main plate 63. The guide piece 66 has a curved shape to be convexed outward. The wire harness 30 housed in the pair of side parts 64 has direct contact with the pair of guide pieces 66 and is guided toward a center of the pair of side parts 64. The guide piece 66 may be omitted.

The main line assembly assisting part 62 includes a fixing component holding part 67 detachably holding the band clamp 40 as the fixing component. Herein, the configuration that the fixing component holding part 67 detachably holds the band clamp 40 as the fixing component includes a case where the fixing component holding part 67 directly holds the band clamp 40, a case where the fixing component holding part 67 holds the band clamp 40 together with the main line part 31, and a case where the fixing component holding part 67 holds the band clamp 40 via the main line part 31.

Herein, the fixing component holding part 67 holds the band clamp 40 together with the main line part 31. That is to say, in a state of holding the main line part 31 in the main line assembly assisting part 62, a part of the main line assembly assisting part 62 where the band clamp 40 is located (two positions in the example in FIG. 2) is the fixing component holding part 67, and this part detachably holds the band clamp 40 together with the main line part 31.

In the above holding state, the fixing component holding part 67 holds the band clamp 40 in a posture of being able to be fixed to the assembled position. That is to say, in the above holding state, the clamp body part 42 of the band clamp 40 protrudes outward through the space between the pair of holding protrusions 65. Then, when the main line part 31 and the main line assembly assisting part 62 are disposed along the predetermined wiring route in the door 22, the band clamp 40 is disposed in a position corresponding to the hole 25h formed in the door 22 (refer to FIG. 8), and the clamp body part 42 takes a posture of facing the hole 25h.

An operation hole 69 into and from which an operation pin 80 as an operation component can be inserted and detached is formed in the fixing component holding part 67. Herein, the operation hole 69 is formed in a position where the band clamp 40 is held in a center of the main plate 63 of the main line assembly assisting part 62 in a width direction. The operation hole 69 may be a circular hole, an oval hole, or a polygonal hole such as a quadrilateral hole.

In the fixing component holding part 67, the band clamp 40 attached to the main line part 31 is directed outward through the space between the pair of holding protrusions 65, thus the operation hole 69 is formed in the main plate 63 in a position opposite to the clamp body part 42. Thus, when the operation pin 80 is inserted into the operation hole 69 to press the main line part 31 and the band clamp 40, the main line part 31 and the band clamp 40 are detached from the fixing component holding part 67. The clamp body part 42 of the band clamp 40 moves outward from the space between the pair of holding protrusions 65, and is inserted and fixed to the hole 25h on a side of the door 22 (refer to FIG. 10 and FIG. 11). That is to say, the fixing component holding part 67 holds the band clamp 40 in a position and a posture where the band clamp 40 is detached from the fixing component holding part 67 and can be fixed to the assembled position by inserting the operation pin 80 into the operation hole 69 to press the band clamp 40. The case where the operation pin 80 as the operation component is inserted into the operation hole 69 to press the band clamp 40 which is the fixing component includes a case where the operation pin 80 directly presses the band clamp 40 and a case where the operation pin 80 presses the band clamp 40 via the main line part 31. For example, when the fixing component is a sleeve clamp, the operation pin 80 preferably presses the sleeve clamp via a part of the wire harness 30.

A positioning surface which can have direct contact with the band clamp 40 from one side or both sides of the main line assembly assisting part 62 in an extension direction may be formed so that the band clamp 40 can be held in a position as constant as possible with respect to the fixing component holding part 67.

Figure 5:
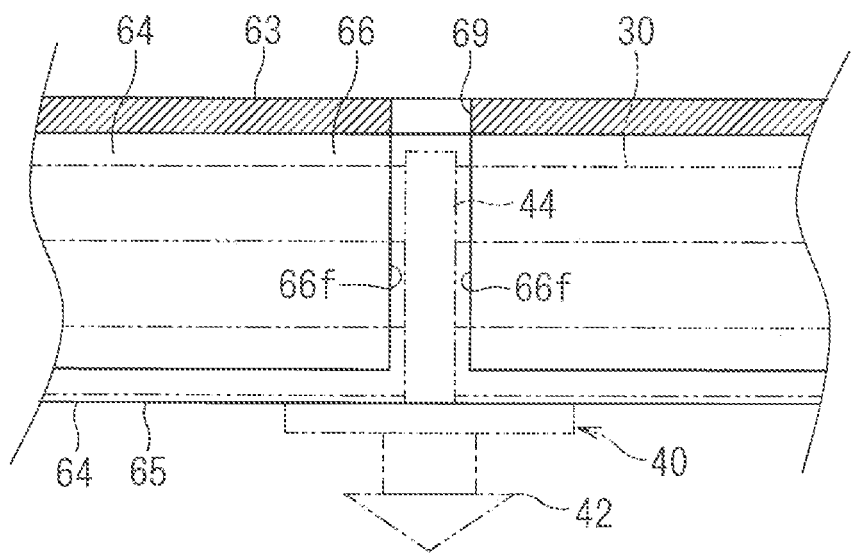
FIG. 5 A schematic cross-sectional view illustrating a wiring body with assembly assisting component according to a first modification example.

In a first modification example illustrated in FIG. 5, a partial concave portion extending in a circumferential direction of the band 44 is formed in a position where the band 44 is disposed in the guide piece 66, and both surfaces of the concave portion are defined as positioning surfaces 66*f*. In this modification example, the positioning surfaces 66*f* can have direct contact with both edges of the band 44 from the both sides of the main line assembly assisting part 62 in the extension direction, thus the band clamp 40 is positioned.

Figure 6:
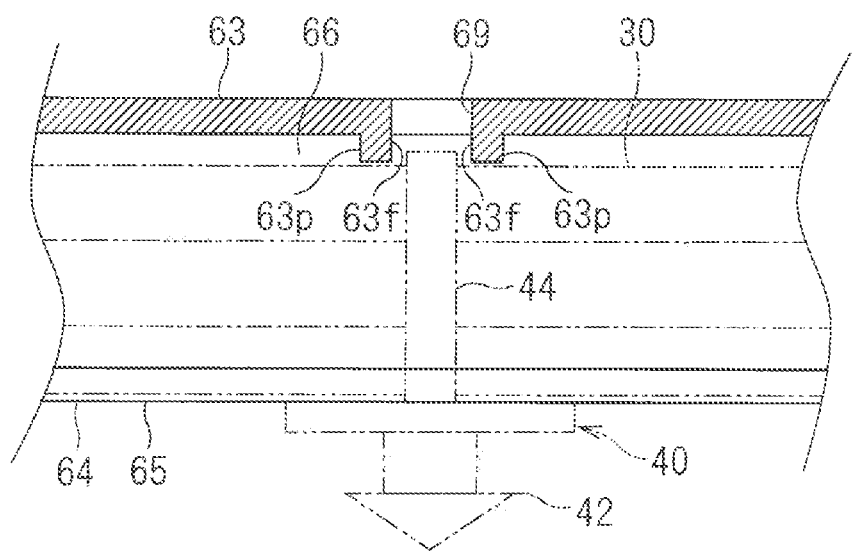
FIG. 6 A schematic cross-sectional view illustrating a wiring body with assembly assisting component according to a second modification example.

In a second modification example illustrated in FIG. 6, a pair of positioning protrusions 63*p* are provided to protrude from a position in the main plate 63, where the band 44 is disposed, at intervals, and inward surfaces of the pair of positioning protrusions are defined as the positioning surfaces 63*f*. In this modification example, the positioning surfaces 63*f* can have direct contact with both edges of the band 44 from the both sides of the main line assembly assisting part 32 in the extension direction, thus the band clamp 40 is positioned.

As a third modification example illustrated in FIG. 7, one end of each of the pair of guide pieces 66 described above may be a free end. In FIG. 7, a side of the guide piece 66 leading to the side part 64 is separated from the side part 64 and defined as a free end 66*e*. Accordingly, the pair of guide pieces 66 are easily deformed in accordance with a thickness of the main line part 31 of the wire harness 30, thus the main line part 31 having various thicknesses can be guided to the center of the main line assembly assisting part 62 in the width direction.

The branch line assembly assisting part 70 is branched laterally from a midway portion the main line assembly assisting part 62, and extends outward. Each the branch line assembly assisting part 70 has the configuration similar to the main line assembly assisting part 62 except that the branch line assembly assisting part 70 is curved in accordance with the route of the branch line part 32 to be held by the branch line assembly assisting part 70, thus the same reference numerals will be assigned to the configuration similar to that of the main line assembly assisting part 62, and the description thereof is omitted.

In the present embodiment, the case where the main line assembly assisting part 62 and the branch line assembly assisting part 70 are curved in the width direction is mainly described, however, there may also be a case where they are curved in a thickness direction of the main plate 63.

A method of manufacturing a wiring body assembly is described. The description herein is based on an assumption that this method is executed by a robot, but may be performed by a person.

Figure 8:
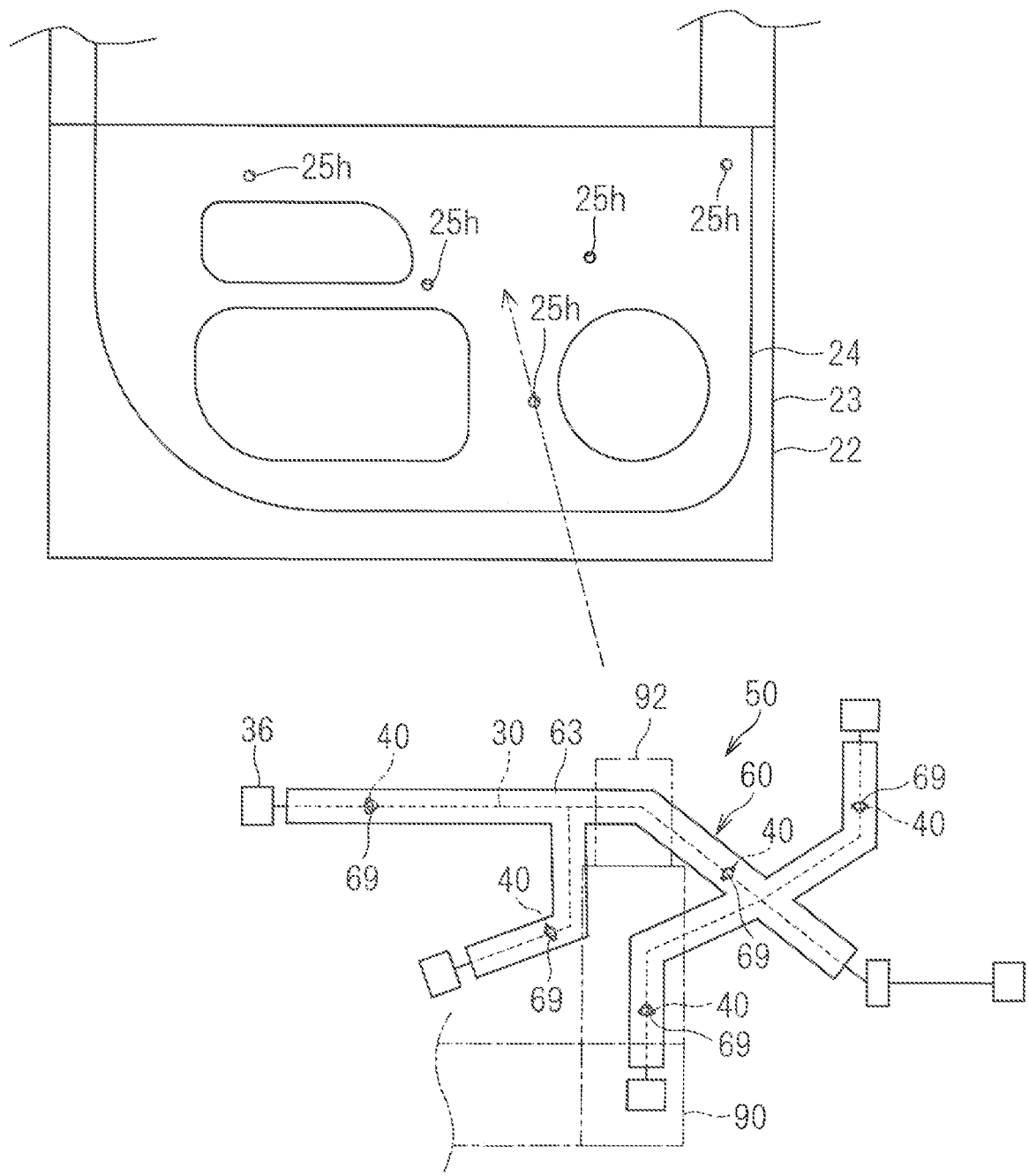
FIG. 8 An explanation drawing illustrating a method of manufacturing a wiring body assembly.

Firstly, as illustrated in FIG. 8, the main line part of the wire harness 30 is held by the main line assembly assisting part 62 and the branch line part 32 is held by the branch line assembly assisting part 70 to prepare the wiring body with assembly assisting component 50. Such a wiring body with assembly assisting component 50 is manufactured in a manufacturing plant of a wire harness and then transferred to a wire harness assembly improvement plant for assembling the wire harness to a vehicle, for example.

Figure 9:
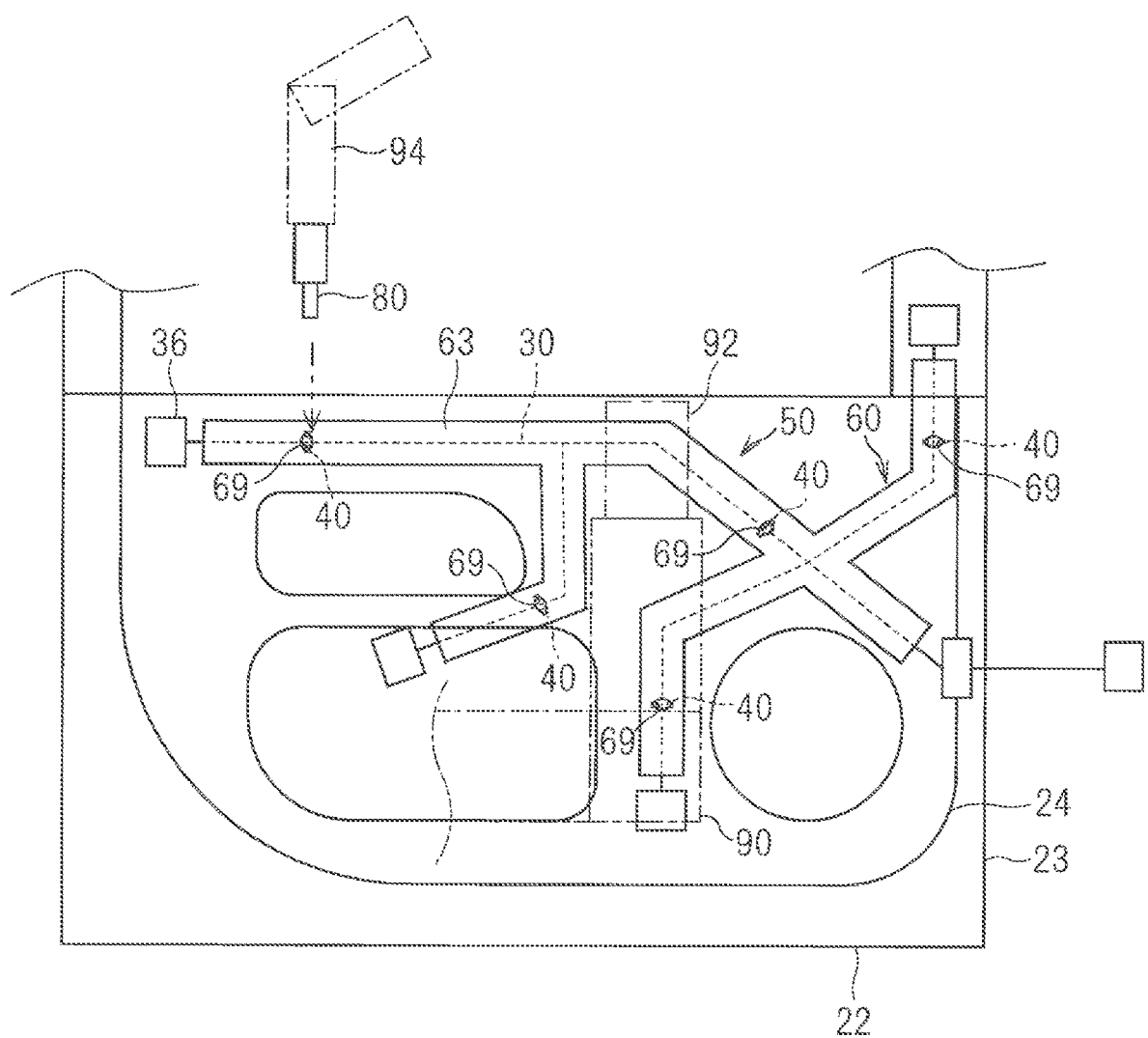
FIG. 9 An explanation drawing illustrating a method of manufacturing a wiring body assembly.
Figure 10:
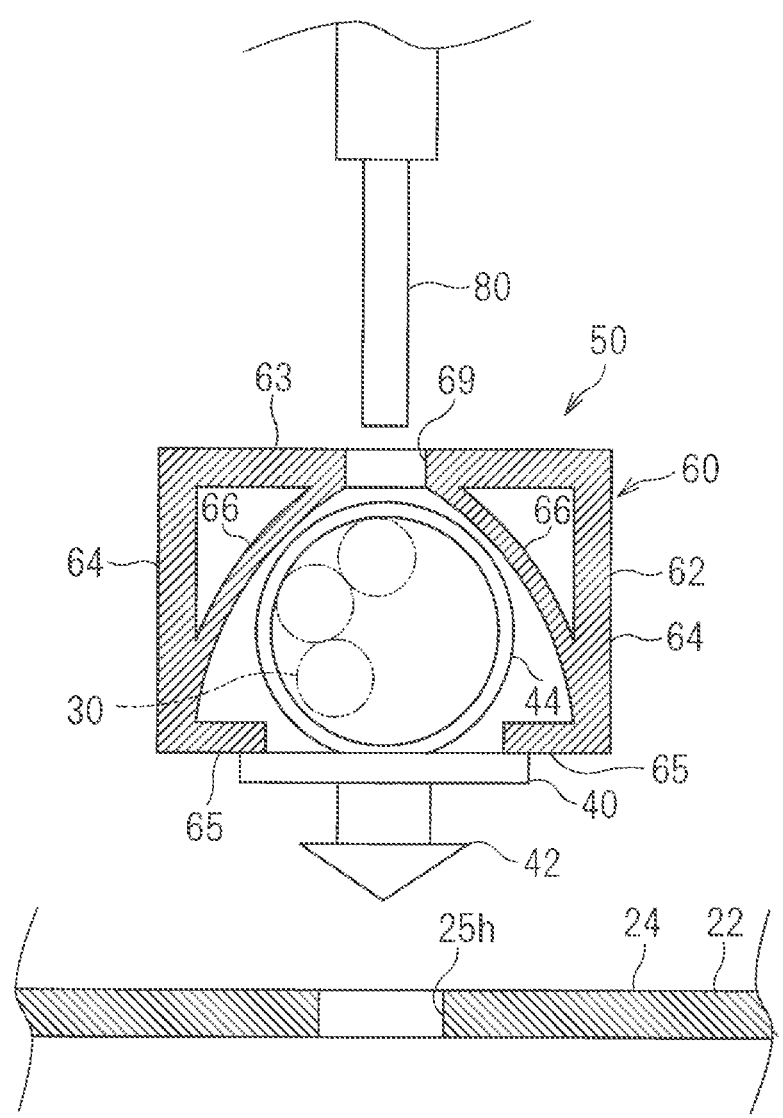
FIG. 10 An explanation drawing illustrating a method of manufacturing a wiring body assembly.

Next, a hand 92 of a robot 90 grasps and moves the assembly assisting component 60 toward the inner panel 24 of the door 22. Then, as illustrated in FIG. 9, the wire harness 30 is disposed on a main surface of the inner panel 24 of the door 22, which is the assembled position, together with the assembly assisting component 60. Accordingly, the wire harness 30 is disposed along a certain route on the door 22 together with the assembly assisting component 60. As illustrated in FIG. 10, the clamp body part 42 of the band clamp 40 held by the fixing component holding part 67 is disposed to be directed to the hole 25*h* of the door 22.

As illustrated in FIG. 9, prepared as the other robot 94 is a robot having the operation pin 80 on an end of an arm as an operation tool. The robot 94 inserts the operation pin 80 into the operation hole 69 while the robot 90 holds the assembly assisting component 60 in a certain position.

Figure 11:
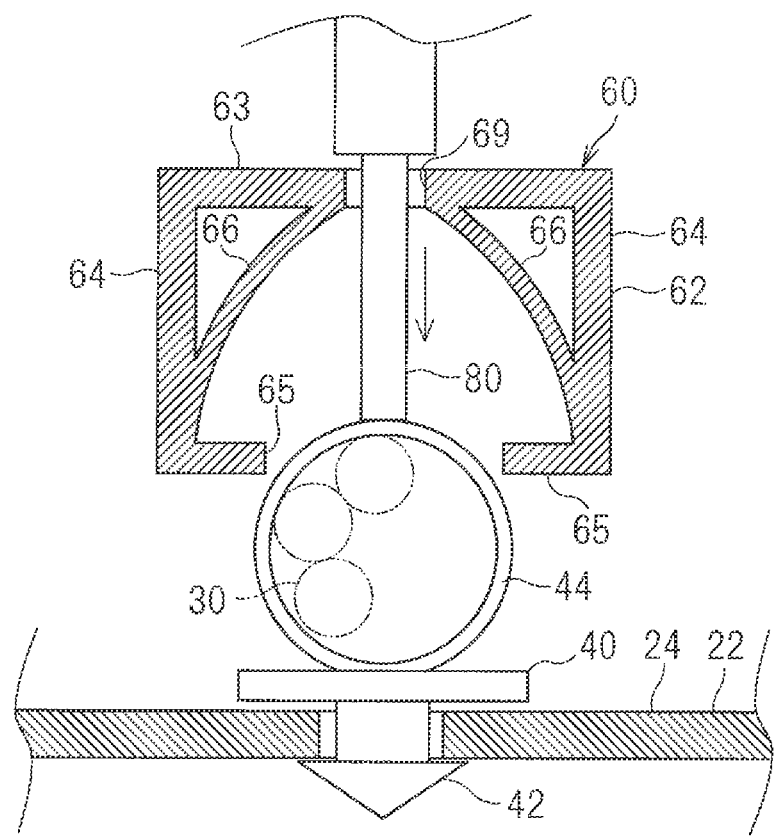
FIG. 11 An explanation drawing illustrating a method of manufacturing a wiring body assembly.

When the operation pin 80 is inserted into the operation hole 69, as illustrated in FIG. 11, the operation pin 80 presses the band clamp 40 together with the wire harness 30. Then, the band clamp 40 goes through the space between the pair of holding protrusions 65 together with the wire harness 30 and is detached from the assembly assisting component 60, and the clamp body part 42 is pressed into the facing hole 25*h*, and is fixed not to come out therefrom. Accordingly, the band clamp 40 is fixed to the door 22.

When the above operation is sequentially performed on the plurality of operation holes 69 and the band clamp 40, the plurality of band clamps 40 are fixed to the door 22 and the wire harness 30 is detached from the assembly assisting component 60 and then, the wire harness 30 is assembled to the door 22 which is the assembled position.

Figure 12:
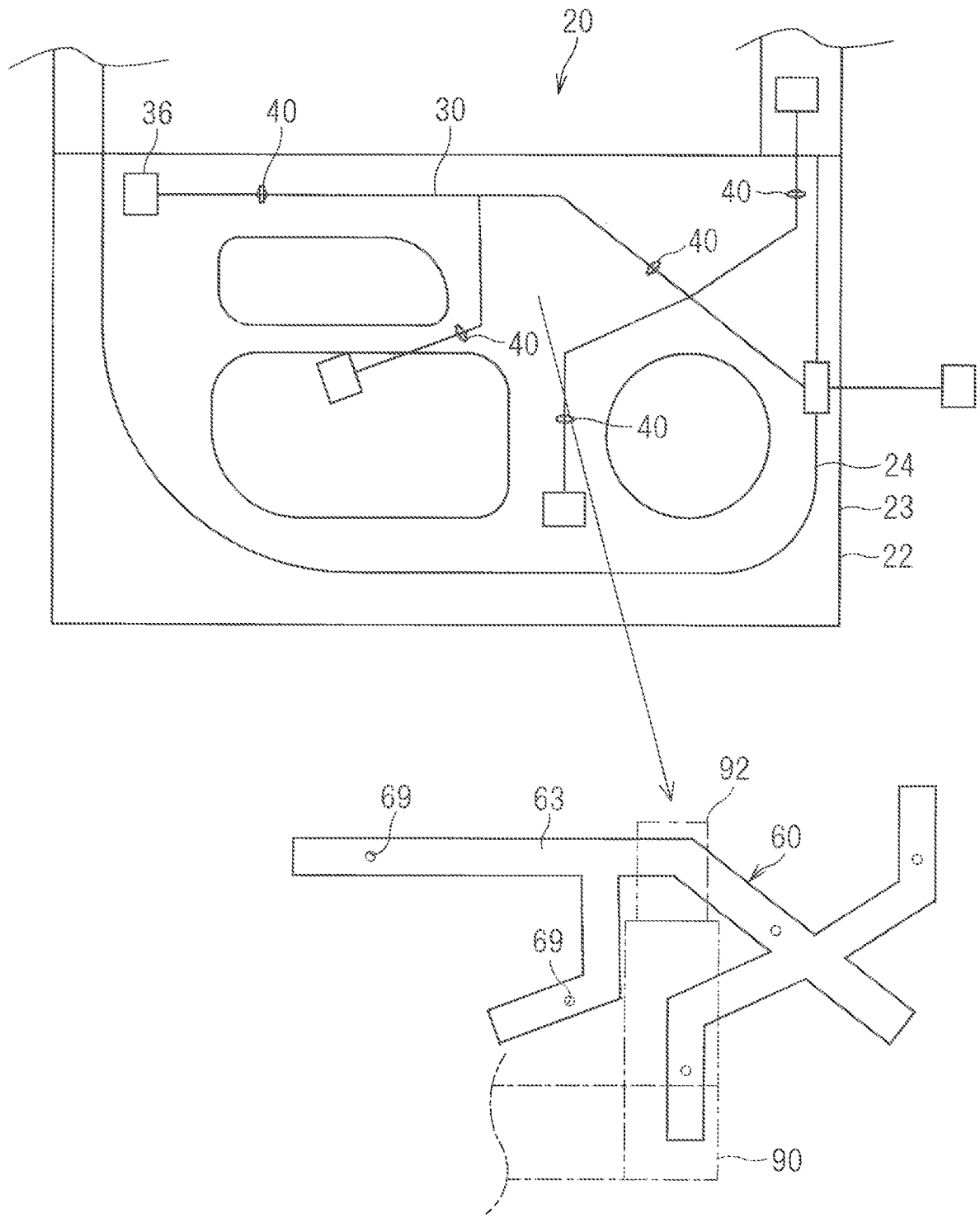
FIG. 12 An explanation drawing illustrating a method of manufacturing a wiring body assembly.

Subsequently, as illustrated in FIG. 12, the robot 90 moves the assembly assisting component 60 to a position apart from the door 22 while the wire harness 30 remains attached to the door 22. The assembly assisting component 60 can be recovered and used for an operation of assembling the next wire harness 30.

In this manner, the door with the wire harness which is the wiring body assembly is manufactured.

As for the operation of connecting the connector 36, the robot may perform an operation of grasping and connecting the connector 36 to a connection destination connector, or the connection operation may be performed by humans.

According to the present embodiment, the wire harness 30 can be disposed on the door 22 which is the assembled position while the part of the wire harness 30 is held by the assembly assisting component 60 along the certain route, and subsequently, the wire harness 30 can be detached from the assembly assisting component 60. Accordingly, the wire harness 30 can easily be disposed on the door 22 which is the assembled position along the predetermined route.

The wiring body is the wire harness 30 including the electrical wiring 33, thus the wire harness 30 which is easily curved in various directions can easily be disposed on the door 22 which is the assembled position along the predetermined route.

The assembly assisting component 60 includes the fixing component holding part 67 detachably holding the band clamp 40, thus the band clamp 40 can be easily disposed near the hole 25*h* which is the predetermined fixing position while the wire harness 30 is easily disposed on the door 22 which is the assembled position along the predetermined route, and the band clamp 40 can be easily fixed to the door 22 which is the assembled position.

The fixing component holding part 67 holds the band clamp 40 in the posture of being able to be fixed to the hole 25*h* of the door 22 which is the assembled position, thus can easily insert and fix the band clamp 40 to the hole 25*h*.

More specifically, the operation hole 69 is formed in the fixing component holding part 67, and the operation pin 80 is inserted into the operation hole 69 to press the band clamp 40 and the wire harness 30, thus the wire harness 30 can be detached from the assembly assisting component 60 and the band clamp 40 can be inserted and fixed to the hole 25*h*. Accordingly, the wire harness 30 can be easily disposed along the predetermined route and the band clamp 40 can be easily fixed to the door which is the assembled position.

The assembly assisting component 60 holds the wire harness 30 in the space surrounded by the main plate 63 and the pair of side parts 64, thus the wire harness 30 hardly comes out from the assembly assisting component 60 and can be easily retained along the certain route.

The assembling operation using the above the assembly assisting component 60 is effective assuming that the assembling operation is performed by the robot. That is to say, the reason is that the operation of locating the wire harness 30 which is the flexible object in the certain route can be easily performed. The wire harness 30 hardly has a curving tendency at a time of storage and transfer, for example, and as a result, an operation of pulling the wire harness 30 for removing the curving tendency of the wire harness 30 can be practicably omitted. The direction of the band clamp 40 which is the fixing component is constant with respect to the assembly assisting component 60, thus the direction of the band clamp 40 needs not be corrected, for example.

Various modification examples are described based on a premise of the embodiment described above.

Described first is a modification example based on an assumption that the fixing component is the connector.

When a connection destination connector, to which the connector 36 is connected, on the end of the wire harness 30 is disposed in a certain position in the assembled position, the connector 36 can be connected to the connection destination connector while the wire harness 30 is disposed on the assembled position along a certain route.

In a fourth modification example illustrated in FIG. 13, a connection destination connector 136 is provided in a position facing the space between the pair of holding protrusions 65 in an assembly assisting component 160 corresponding to the assembly assisting component 60.

In this case, the connector 36 is preferably held between the main plate 63 and the pair of side parts 64 in a posture where a tip end portion side of the connector 36 in a connection direction is directed to the pair of holding protrusions 65, and held by the pair of holding protrusions 65 to hardly come out from the space therebetween.

In this case, in the manner similar to the embodiments described above, the wire harness 30 is disposed on the assembled position along a predetermined route, and the operation pin 80 is inserted into the operation hole 69 in a state where the connector 36 has a posture of facing the connection destination connector 136. Then, the operation pin 80 presses the connector 36, and the connector 36 slips out of the space between the pair of side parts 64 through the pair of holding protrusions 65 by the elastic deformation of the pair of side parts 64 and pair of holding protrusions 65, and is inserted and fixed to the connection destination connector 136.

Figure 14:
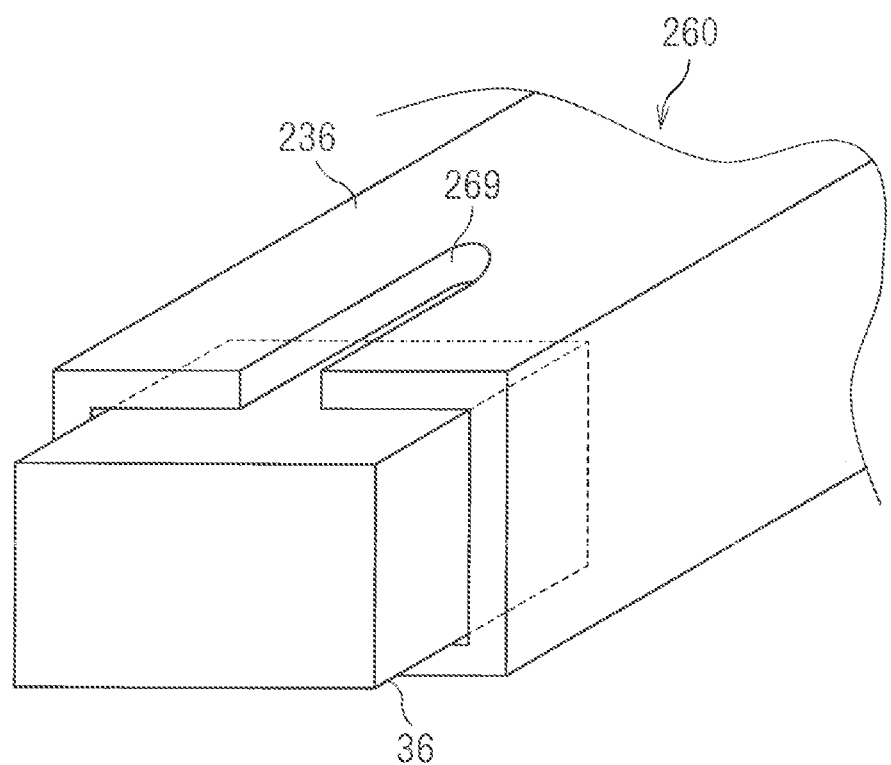
FIG. 14 A schematic perspective view illustrating a wiring body with assembly assisting component according to a fifth modification example.

In a fifth modification example illustrated in FIG. 14, a connection destination connector 236 is provided in a position facing an opening on an end portion of the assembly assisting component 260 corresponding to the assembly assisting component 60.

In this case, the connector 36 is preferably held between the main plate 63, the pair of side parts 64, and the pair of holding protrusions 65 in a posture where the tip end portion side of the connector 36 in the connection direction is directed outward from an opening on an end portion of the assembly assisting component 60. A slit-shaped operation hole 269 is formed in a position from the end portion of the assembly assisting component 260 toward a back side thereof.

Figure 15:
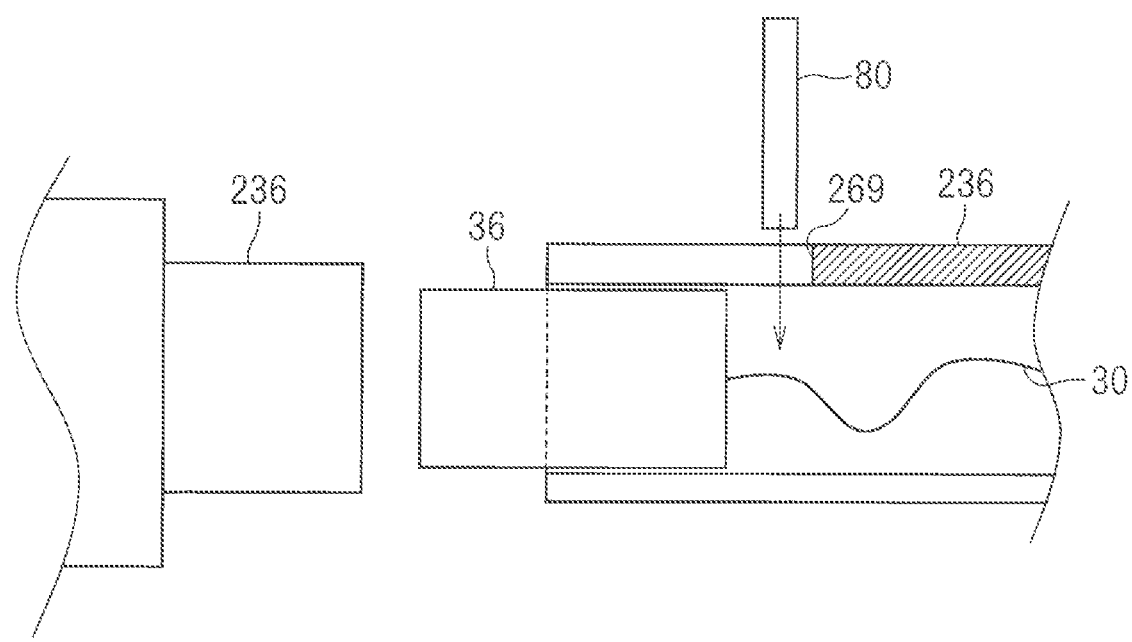
FIG. 15 A schematic cross-sectional view illustrating a wiring body with assembly assisting component according to the fifth modification example.
Figure 16:
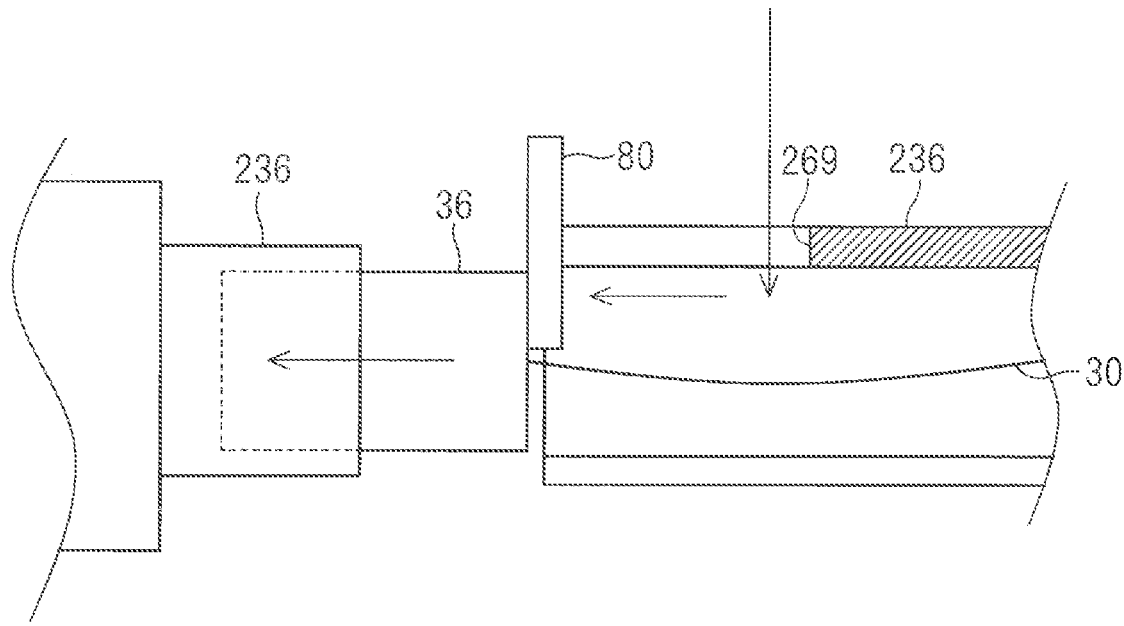
FIG. 16 A schematic cross-sectional view illustrating a wiring body with assembly assisting component according to the fifth modification example.

In this case, as illustrated in FIG. 15, the wire harness 30 is disposed on the assembled position along a predetermined route, and the operation pin 80 is inserted into a back side of the operation hole 269 in a state where the connector 36 on the end portion of the assembly assisting component 260 has a posture of facing the connection destination connector 236. Then, as illustrated in FIG. 16, when the operation pin 80 is moved from the back side of the operation hole 269 toward an opening side thereof, the operation pin 80 presses the connector 36 outside the end portion of the assembly assisting component 260. Then, the connector 36 slips out the assembly assisting component 260 through the opening on the end portion, and is inserted and fixed to the connection destination connector 236.

When the connection direction of the connector is a direction along the width direction of the assembly assisting component, the connector can be connected to the other side connector in the manner similar to the above configuration by making the direction of the above configuration coincide with the direction along the width direction of the assembly assisting component and pressing the connector outside the assembly assisting component in the width direction.

In these cases, the connector 36 indicates an example of a fixing component which is attached to the wire harness 30, which is the wiring component, and can be fixed to the assembled position. In these manners, the connector 36 as the fixing component in the various directions can be connected in the various directions.

In the examples described in the above embodiments, the wire harness 30 is held by one assembly assisting component 60, however the wire harness may be held by a plurality of assembly assisting components.

Figure 17:
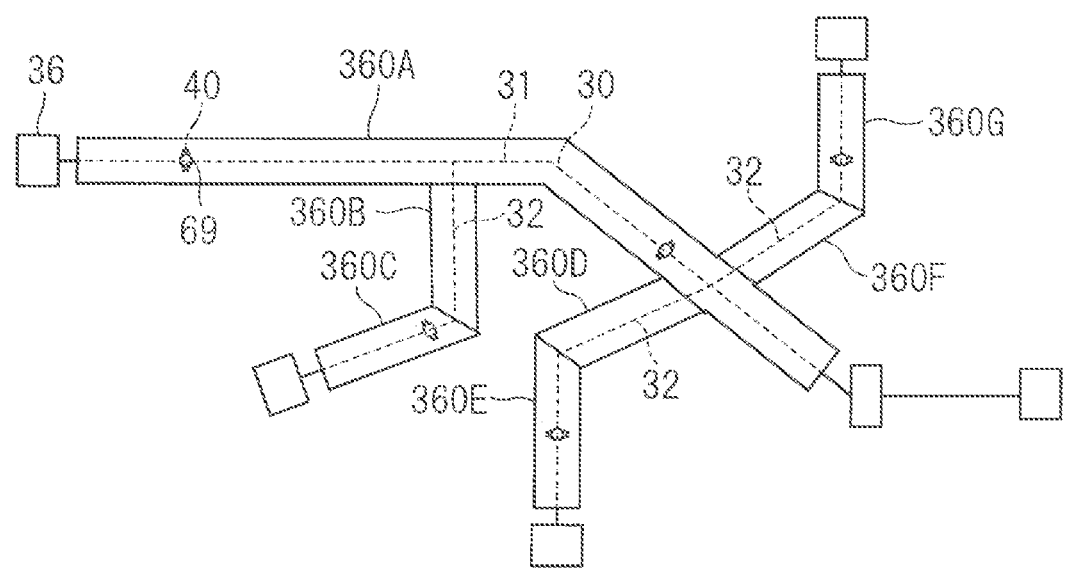
FIG. 17 A schematic plan view illustrating an assembly assisting component according to a sixth modification example.

In a sixth modification example illustrated in FIG. 17, the assembly assisting component 60 described in the above embodiments is separated into a plurality of assembly assisting components 360A, 360B, 360C, 360D, 360E, 360F, and 360G. Herein, the main line assembly assisting part 62 described in the above embodiments is made up of one component as the assembly assisting component 360A. The three branch line assembly assisting parts 70 are separated from the main line assembly assisting part 62, and further separated at bent portions thereof to form the plurality of assembly assisting components 360B, 360C, 360D, 360E, 360F, and 360G.

Figure 18:
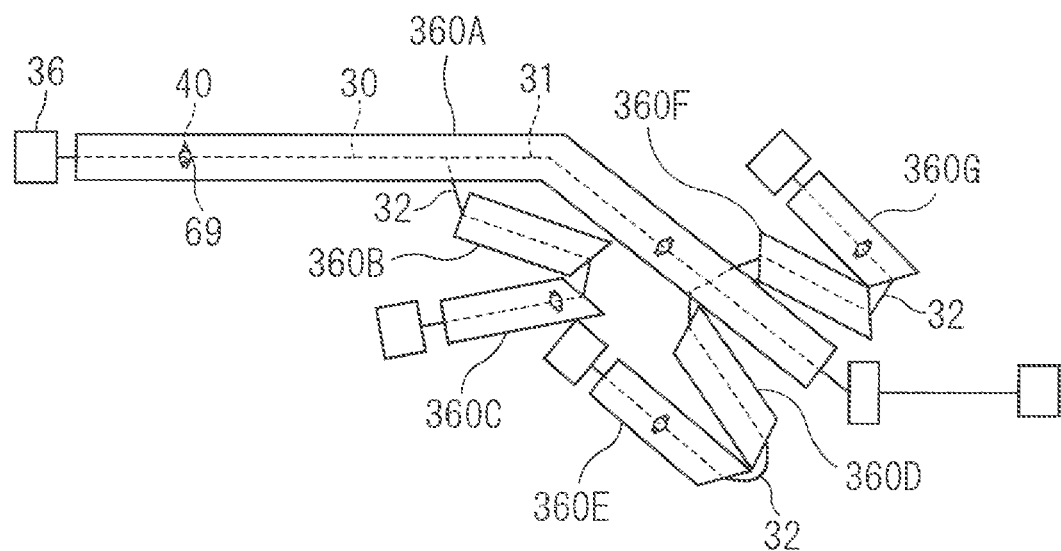
FIG. 18 A schematic plan view illustrating an assembly assisting component according to the sixth modification example.

According to this example, each of the plurality of assembly assisting components 360A, 360B, 360C, 360D, 360E, 360F, and 360G holds at least a part of the wire harness 30 along a certain route, thus the wire harness 30 can be held in various forms. The wire harness 30 can be curved between the plurality of assembly assisting components 360A, 360B, 360C, 360D, 360E, 360F, and 360G, thus as illustrated in FIG. 18, the wire harness 30 can have a compact form at the time of storage and transfer, for example.

In this example, when the operation of assembling the wire harness 30 is performed, the plurality of assembly assisting components 360A, 360B, 360C, 360D, 360E, 360F, and 360G may be sequentially held by the robot to perform the assembling operation.

In this manner, when the wire harness 30 includes the plurality of assembly assisting components 360A, 360B, 360C, 360D, 360E, 360F, and 360G, preferable is a configuration that all of the plurality of assembly assisting components 360A, 360B, 360C, 360D, 360E, 360F, and 360G hold at least a part of the wire harness 30 along a certain route, however, all of them need not have the fixing component holding part 67 and the operation hole 69, for example.

Figure 19:
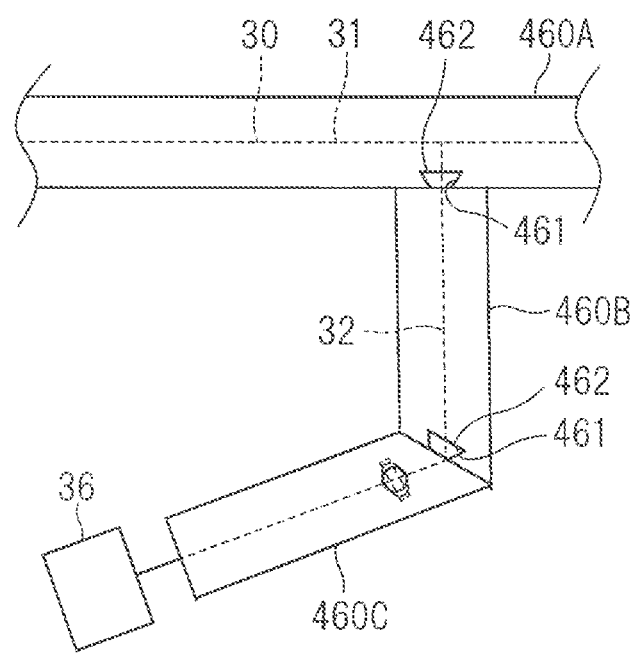
FIG. 19 A schematic plan view illustrating an assembly assisting component according to a seventh modification example.
Figure 20:
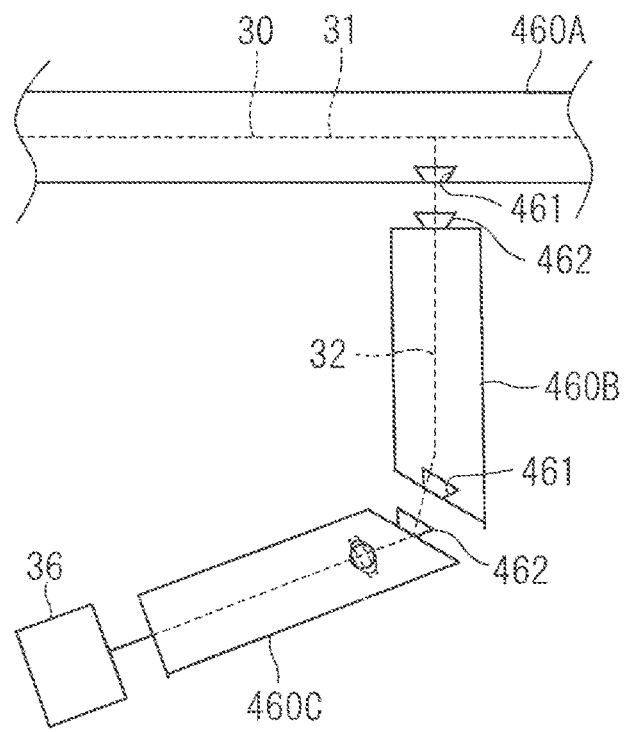
FIG. 20 A partial schematic plan view illustrating an assembly assisting component according to the seventh modification example.

When the wire harness 30 is held by a plurality of assembly assisting components, as a seventh example modification example illustrated in FIG. 19 and FIG. 20, at least two of the plurality of assembly assisting components are preferably separated from and incorporated with each other. This example indicates that assembly assisting components 460A, 460B, and 460C corresponding to the assembly assisting components 360A, 360B, and 360C can be separated from and incorporated with each other.

More specifically, a concave portion 461 is formed in one of a side part of the assembly assisting component 460A and one end portion of the assembly assisting component 460B, and a protrusion 462 is formed on the other of the side part of the assembly assisting component 460A and the one end portion of the assembly assisting component 460B. The concave portion 461 is formed in one of the other end portion of the assembly assisting component 460B and one end portion of the assembly assisting component 460C, and a protrusion 462 is formed on the other of the other end portion of the assembly assisting component 460B and the one end portion of the assembly assisting component 460C. Herein, the protrusion 462 is formed into a trapezoidal shape whose width gradually increases toward a tip end portion thereof, and the concave portion 461 is formed into a concave shape into which the protrusion 462 can be fitted. The protrusion 462 is fitted into the concave portion 461, thus the assembly assisting component 460B is connected to be separable from the side part of the assembly assisting component 460A, and the assembly assisting component 460C is connected to be separable from the assembly assisting component 460B.

According to this example, the assembly assisting components 460A, 460B, and 460C can be separated and relatively take a compact form at the time of storage and transfer, for example. When the operation of assembling the wire harness 30 is performed, the assembly assisting components 460A, 460B, and 460C are incorporated with each other, thus can be managed as one component, and a relatively long region of the wire harness 30 can be easily disposed along a certain route.

Figure 21:
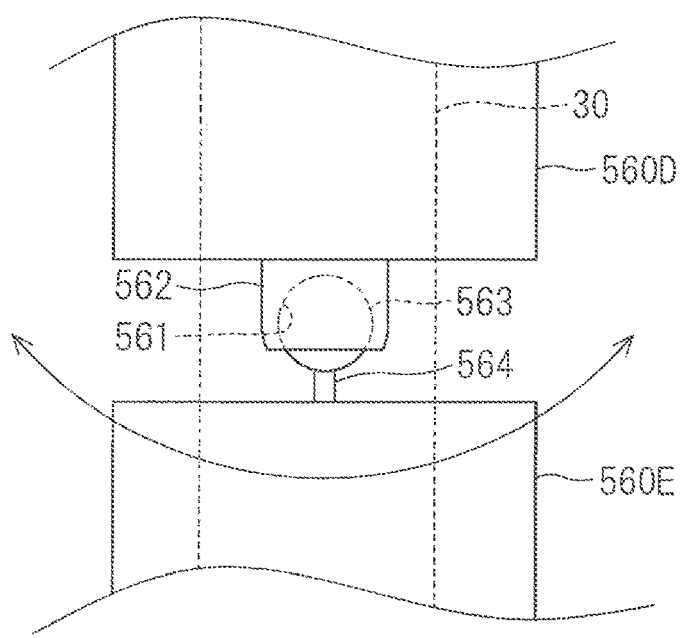
FIG. 21 A partial schematic plan view illustrating an assembly assisting component according to an eighth modification example.

When the wire harness 30 is held by a plurality of assembly assisting components, as an eighth modification example illustrated in FIG. 21, at least two of the plurality of assembly assisting components may be connected to be able to be mutually bent. This example indicates a case where the assembly assisting components 560D and 560E corresponding to the assembly assisting components 360D and 360E are connected to be able to be mutually bent.

More specifically, a connection concave portion 562 having a hollow 561 having a size exceeding a hemisphere is formed in one end portion of the assembly assisting component 560D, and a connection protrusion 564 having a sphere portion 563 is formed in one end portion of the assembly assisting component 560E. The sphere portion 563 described above is fitted into the hollow 561 not to come out therefrom, and the assembly assisting components 560D and 560E are connected to be able to be mutually bent within a range that the sphere portion 563 can rotate in the hollow 561.

According to this example, the assembly assisting components 560D and 560E are greatly bent, thus the assembly assisting components 560D and 560E and the wire harness 30 held by the assembly assisting components 560D and 560E can relatively take a compact form at the time of storage and transfer, for example. When the operation of assembling the wire harness 30 is performed, the assembly assisting components 560D and 560E are bent at an angle in accordance with a predetermined route, thus a relatively long region of the wire harness 30 can be easily disposed along a certain route. The assembly assisting components 560D and 560E may be configured to keep a bending form constant to some degree by friction force between the sphere portion 563 and the hollow 561, or configured to be freely bent.

The plurality of assembly assisting components may be connected to be able to be bent via a thin hinge, for example.

Figure 22:
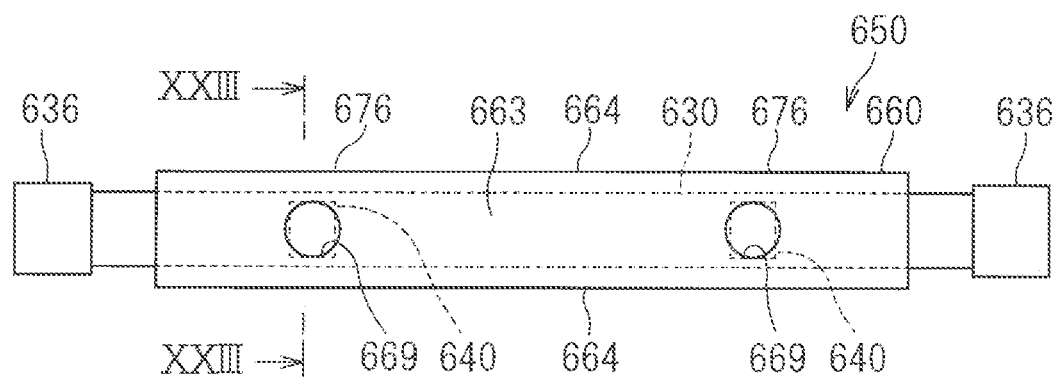
FIG. 22 A partial schematic plan view illustrating s wiring body with assembly assisting component according to a ninth modification example.
Figure 23:
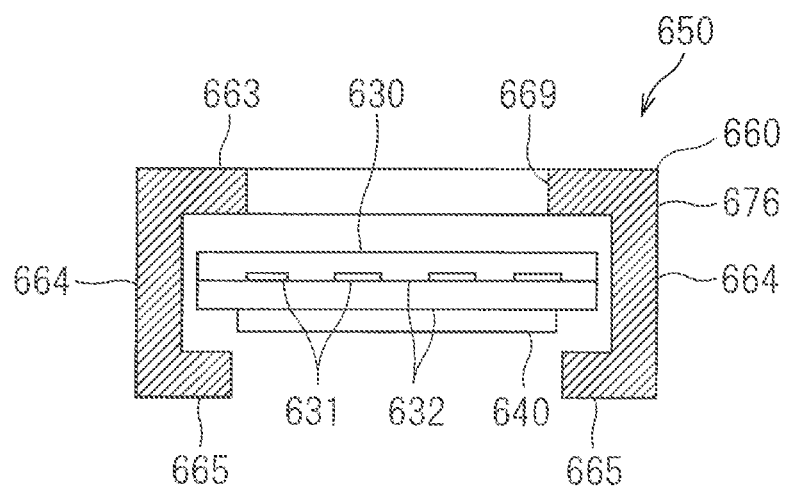
FIG. 23 A schematic cross-sectional view along a XXIII-XXIII line in FIG. 22.

In the example described in above embodiments, the wiring body is the wire harness 30 including the electrical wiring 33 as the wiring component, however, as a ninth modification example illustrated in FIG. 22 to FIG. 24, a wiring body 630 may include a band-like cable which can be curved as a wiring member.

That is to say, a wiring body with assembly assisting component 650 according to the present modification example includes the wiring body 630 and an assembly assisting component 660.

The wiring body 630 includes a flexible flat cable (FFC) as a band-like cable which can be curved. A connector 636 is connected to an end portion of the wiring body 630.

The FFC is a wiring body made up of a plurality of linear conductors 631 disposed in parallel at intervals and sandwiched between a pair of insulating films 632. Also adoptable as the other band-like cable which can be curved are a cable made up of a plurality of electrical wirings connected in parallel, a cable made up of a plurality of linear conductors extrusion covered by an insulating covering such as a resin, a cable made by forming a predetermined circuit pattern on one of insulating films with a copper foil and overlapping the other one of insulating films thereon, for example.

A double-sided tape 640 is attached as a fixing component to at least one position (to positions in FIG. 22) in a center of the wiring body 630 in an extension direction. The double-sided tape 640 is a member having adhesion on both surfaces, and one main surface thereof is attached to one main surface of the wiring body 630. An adhesive surface on the other side of the double-sided tape 640 is directed to an outer side of the one main surface of the wiring body 630. In a state before the double-sided tape 640 is attached and fixed to the assembled position, a releasing paper may be attached to the adhesive surface on the other side of the double-sided tape 640. A butyl adhesive tape, for example, may also be adopted as the fixing component.

A junction box joining and branching a conductor included in the wiring body 630 may be provided in a midway portion of the wiring body 630.

The assembly assisting component 660 is a member formed of a resin or metal, for example, and detachably holds at least a part of the wiring body 630 along a certain route (a linear route herein).

More specifically, the assembly assisting component 660 includes a main plate 663, a pair of side parts 664, and a pair of holding protrusions 665.

The main plate 663 is formed into an elongated plate-like shape. The main plate 663 may be curved in a width direction or a thickness direction in a midway portion thereof in accordance with the route of the wiring body 630.

The pair of side parts 664 are provided on both sides of the main plate 663, and protrude toward one main surface side of the main plate 663. A width dimension of the main plate 663 is set equal to or larger than a width of the wiring body 630, and a protrusion dimension of the pair of side parts 64 is set equal to or larger than a thickness of the wiring body 630. The wiring body 630 can be housed along a certain route in a space surrounded by the main plate 663 and the pair of side parts 664.

The pair of holding protrusions 665 protrude inward from tip end portions of the pair of side parts 664, and hold the wiring body 630 in the space surrounded by the main plate 663 and the pair of side parts 664. Herein, a dimension between the tip end portions of the pair of holding protrusions 665 is set smaller than the width of the wiring body 630. Accordingly, the wiring body 630 housed in the space surrounded by the main plate 663 and the pair of side parts 664 is held to hardly come out from the assembly assisting component 660 through a space between the pair of holding protrusions 665.

As described in the above embodiments, a holding protrusion may be provided on only one side part of the pair of holding protrusions. At least one of the pair of side parts and the pair of holding protrusions may be partially provided in a position of the main plate in the extension direction.

The assembly assisting component 660 includes a fixing component holding part 676 detachably holding the double-sided tape 640 as the fixing component. Herein, the fixing component holding part 676 holds the double-sided tape 640 via the wiring body 630. That is to say, in a state of holding the wiring body 630 in the assembly assisting component 660, a position where the double-sided tape 640 is located (two positions in the example in FIG. 22) is the fixing component holding part 676, and this part detachably holds the position where the double-sided tape 640 is attached in the wiring body 630 together with the double-sided tape 640.

In the above holding state, the fixing component holding part 676 holds the double-sided tape 640 in a posture of being able to be fixed to the assembled position. That is to say, in the above holding state, the outward adhesive surface of the double-sided tape 640 faces outward through the space between the pair of holding protrusions 65. When the wiring body 630 is disposed along a predetermined wiring route of the assembled position, the double-sided tape 640 is disposed in a position corresponding to a region where the double-sided tape 640 is attached in the assembled position.

An operation hole 669 into and from which an operation pin 80 as an operation component can be inserted and detached is formed in the fixing component holding part 676. Herein, the operation hole 669 is formed in a part where the double-sided tape 640 is disposed in a center of the main plate 663 of the assembly assisting component 660 in a width direction. The operation hole 669 may be a circular hole, an oval hole, or a polygonal hole such as a quadrilateral hole.

The wiring body 630 and the assembly assisting component 660 are disposed on the assembled position 622 along a predetermined route so that the double-sided tape 640 is directed to the assembly assisting component 622. When the operation pin 80 is inserted into the operation hole 669 to press the wiring body 630 in this state, the wiring body 630 and the double-sided tape 640 are pressed out of the fixing component holding part 676 by an elastic deformation of at least one of the wiring body 630, the pair of side parts 664, and the pair of holding protrusions 65 (refer to FIG. 24). Then, the double-sided tape 640 is pressed by the assembly assisting component 622, and attached and fixed to the assembled position 622 in a state where the wiring body 630 is disposed along the predetermined route. That is to say, the fixing component holding part 676 is an example of holding the double-sided tape 640 in a position and a posture of being able to be fixed to the assembled position 622 by inserting the operation pin 80 into the operation hole 669 to press the double-sided tape 640 via the wiring body 630, thereby detaching the double-sided tape 640 from the fixing component holding part 676.

Accordingly, the wiring body 630 including a band-like cable which can be curved such as a flexible flat cable, for example, can be easily disposed along the predetermined route.

Modification Example

A protection member such as a resin sheet, a corrugated tube, a protector may be attached around the wire harness 30 and the wiring body 630.

Each configuration described in the above embodiments and modification examples thereof can be appropriately combined as long as they are not contradictory. For example, the wiring body may be a composite body of bundled electrical wirings and a band-like cable which can be curved. Some of the plurality of assembly assisting components can be separated from and incorporated with each other, and the other some of them may be connected to be able to be mutually bent.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 20 wiring body assembly
22 door
25h hole
30 wire harness
33 electrical wiring
36 connector
40 band clamp
42 clamp body part
44 band
50, 650 wiring body with assembly assisting component
60, 160, 260, 660 assembly assisting component
62 main line assembly assisting part
63, 663 main plate
64, 664 side part
65, 665 holding protrusion
67, 676 fixing component holding part
69, 269, 669 operation hole
70 branch line assembly assisting part
80 operation pin
360A, 360B, 360C, 360D, 360E, 360F, 360G assembly assisting component
460A, 460B, 460C assembly assisting component
461 concave portion
462 protrusion
560D, 560E assembly assisting component
562 connection concave portion
564 connection protrusion
622 assembled position
630 wiring body
640 double-sided tape

The invention claimed is:
1. A wiring body with assembly assisting component, comprising:
a wiring body including a wiring component; and
at least one assembly assisting component detachably holding at least a part of the wiring body along a certain bent route,
wherein the at least one assembly assisting component includes an elongated main plate that is bent in a width direction of the elongated main plate in accordance with the certain bent route, the at least one assembly assisting component further includes a pair of side parts provided on both sides of the main plate in the width direction, and at least one holding protrusion protruding inward in the width direction from at least one of tip end portions of the pair of side parts, the at least one holding protrusion holding the wiring component within a space surrounded by the main plate and the pair of side parts, the at least one holding protrusion includes a first holding protrusion protruding inward in the width direction from a first tip end portion of one of the pair of side parts towards a second tip end portion of the other one of the pair of side parts, and a gap is defined between the first holding protrusion and the second tip end portion of the other one of the pair of side parts, and the wiring component housed in the assembly assisting component is exposed through the gap.

2. The wiring body with assembly assisting component according to claim 1, comprising
an electrical wiring as the wiring component.

3. The wiring body with assembly assisting component according to claim 1, comprising
a band-like cable which can be curved as the wiring component.

4. The wiring body with assembly assisting component according to claim 1, wherein
the wiring body includes a fixing component attached to the wiring component and can be fixed to an assembled position, and
the at least one assembly assisting component includes a fixing component holding part detachably holding the fixing component.

5. The wiring body with assembly assisting component according to claim 4, wherein
the fixing component holding part holds the fixing component in a posture of being able to be fixed to an assembled position.

6. The wiring body with assembly assisting component according to claim 4, wherein
an operation hole into and from which an operation component can be inserted and detached is provided in the elongated main plate such that the operation hole faces and is directed toward the gap, and
the fixing component holding part holds the fixing component in a position and a posture where the fixing component is detached from the fixing component holding part and can be fixed to an assembled position by inserting the operation component into the operation hole to press the fixing component.

7. The wiring body with assembly assisting component according to claim 1, wherein
the at least one assembly assisting component comprises a plurality of assembly assisting components.

8. The wiring body with assembly assisting component according to claim 7, wherein
at least two of the plurality of assembly assisting components can be separated from and incorporated with each other.

9. The wiring body with assembly assisting component according to claim 7, wherein
at least two of the plurality of assembly assisting components are connected to be able to be mutually bent.

10. An assembly assisting component of a wiring body, wherein
the assembly assisting component detachably holds at least a part of a wiring body including a wiring component along a certain bent route,
wherein the assembly assisting component includes an elongated main plate that is bent in a width direction of the elongated main plate in accordance with the certain bent route,
the at least one assembly assisting component further includes a pair of side parts provided on both sides of the main plate in the width direction, and at least one holding protrusion protruding inward in the width direction from at least one of tip end portions of the pair of side parts, the at least one holding protrusion holding the wiring component within a space surrounded by the main plate and the pair of side parts,
the at least one holding protrusion includes a first holding protrusion protruding inward in the width direction from a first tip end portion of one of the pair of side parts towards a second tip end portion of the other one of the pair of side parts, and
a gap is defined between the first holding protrusion and the second tip end portion of the other one of the pair of side parts, and the wiring component housed in the assembly assisting component is exposed through the gap.

11. The wiring body with assembly assisting component according to claim 1, wherein
the wiring component can be detached from the pair of side parts from an opposite side of the main plate through the gap.

12. The wiring body with assembly assisting component according to claim 1, wherein the at least one holding protrusion further includes a second holding protrusion protruding inward in the width direction from the second tip end portion of the other one of the pair of side parts towards the first tip end portion the one of the pair of side parts, and
the gap is defined between the first holding protrusion and the second holding protrusion.

* * * * *